Oct. 8, 1935.  R. SANNIPOLI  2,016,823
FRUIT JAR VISE
Filed June 7, 1934
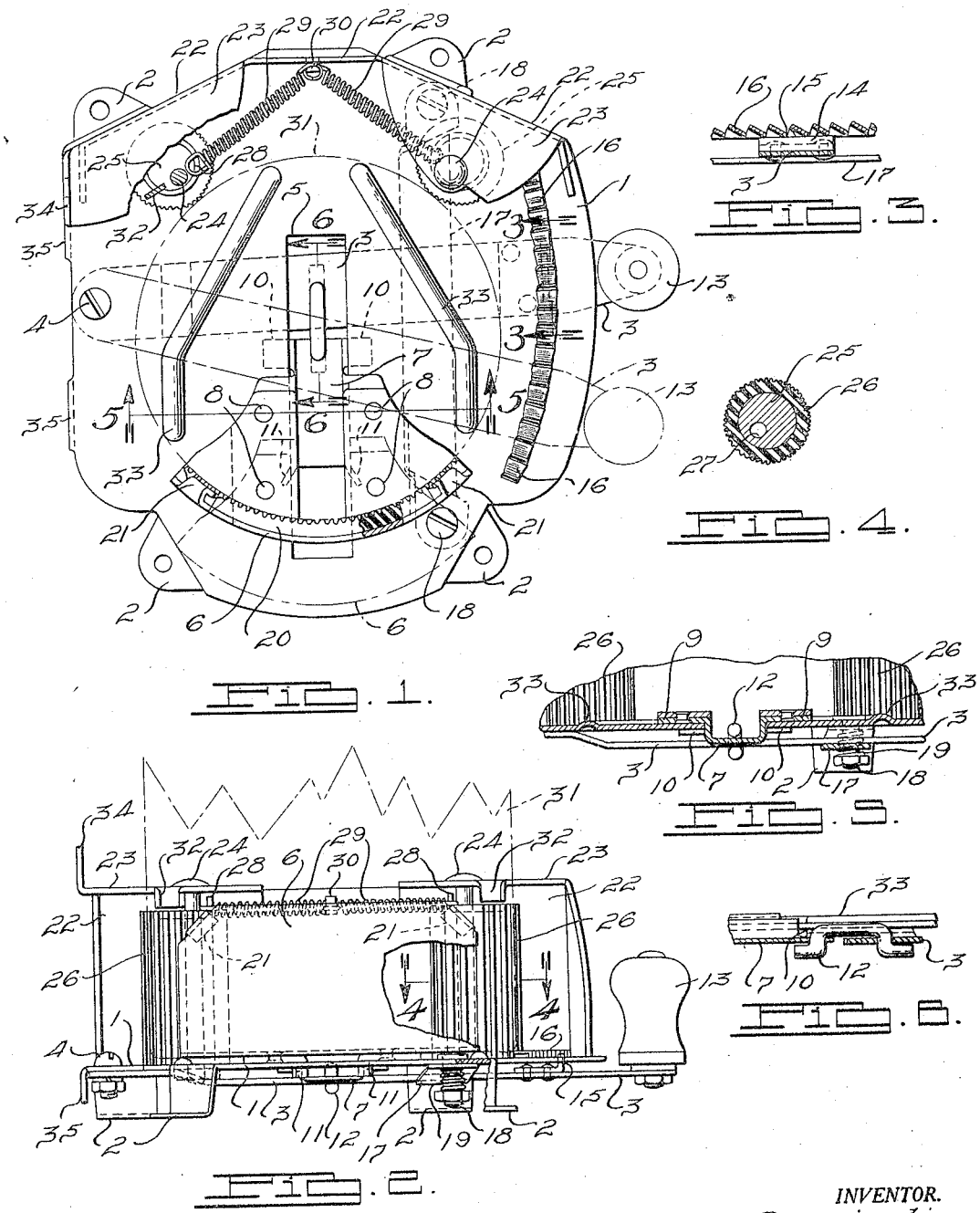
INVENTOR.
Roger Sannipoli.
BY
ATTORNEY.

Patented Oct. 8, 1935

2,016,823

UNITED STATES PATENT OFFICE 2,016,823

FRUIT JAR VISE

Roger Sannipoli, Detroit, Mich.

Application June 7, 1934, Serial No. 729,461

5 Claims. (Cl. 81—3.3)

This invention relates to fruit jar vises and the object of the invention is to provide a vise for holding a fruit jar during application or removal of the fruit jar cap.

Cap wrenches for removing the caps from fruit jars are well known but the main difficulty is to hold the fruit jar from turning while applying pressure to the cap wrench and the object of this invention is to provide a means for preventing the fruit jar from rotating even when considerable pressure is used in applying or removing the cap.

Another object of the invention is to provide a fruit jar vise which will also hold the fruit jar when the cap is being turned down tightly with a wrench to seal the cap.

A further object of the invention is to provide a base member having a movable jaw for engaging the fruit jar and provided with eccentrically mounted rollers engaging the opposite side of the fruit jar whereby the eccentric rollers are turned in turning the fruit jar to bring the higher portions of the eccentric rollers into engagement with the fruit jar and firmly grip the jar between the rollers and jaw to prevent further rotation thereof.

Another object of the invention is to provide a fruit jar vise which will operate upon rotation of the fruit jar in either direction.

A further object of the invention is to provide a fruit jar vise in which the vise may be easily and quickly operated to engage the fruit jar and may be as quickly released.

These objects and the several novel features of the invention are hereinafter more fully described and claimed and the preferred form of construction by which these objects are attained is shown in the accompanying drawing in which—

Fig. 1 is a plan view of a fruit jar vise embodying my invention and partly broken away to show the construction.

Fig. 2 is an elevation of the fruit jar vise taken from the lower side of Fig. 1.

Fig. 3 is an enlarged section taken on line 3—3 of Fig. 1.

Fig. 4 is a section taken on line 4—4 of Fig. 2.

Fig. 5 is a section taken on line 5—5 of Fig. 1.

Fig. 6 is a section taken on line 6—6 of Fig. 1.

The device comprises a base plate 1 having a series of integral lugs 2 by which the device may be secured to a table or other flat surface. A lever 3 extends underneath the base plate and is pivoted thereto at 4 as shown in Figs. 1 and 2. The base plate is provided with a central longitudinal slot 5. An arcuate jar engaging jaw or shoe 6 is provided and is secured to the flanges 9 of a U-shaped member 7 by the rivets 8 so that the jaw 6 is slidable longitudinally of the slot 5. This U-shaped member 7, as shown in Fig. 5, extends downwardly through the slot 5 and the flanges 9 ride on the upper side of the base plate 1 and lugs 10 at the forward end of said member 7 ride on the underside of the base plate. At the rear end, this U-shaped member 7 is provided with out-turned lugs 11, shown in Figs. 1 and 2, which ride on the underside of the base plate. As shown more particularly in Fig. 6, a link 12 extends through an aperture provided therefor in the forward end of the U-shaped member 7 and this link also extends through an aperture provided therefor in the lever 3. By this arrangement, the handle 13 of the lever 3 may be grasped in the hand and by turning this lever on the pivot 4 the jaw 6 may be moved longitudinally of the slot 5 in the base.

The lever 3, as shown in Fig. 3, is provided with a bracket 14 having an extending tooth 15 and this tooth 15 is adapted to engage in the teeth 16 formed in the base plate 1, as shown at the right of Fig. 2 and in Fig. 3. In order to move the lever 3 upwardly, a bar 17 is provided thereunderneath which is supported on the bolts 18 and a spring 19 is mounted on each bolt, as will be understood from Figs. 2 and 5, which tends to push the bar 17 upwardly and by the engagement of the bar 17 with the lever 13 forces this lever upwardly thus forcing the tooth 15 into engagement with the teeth 16 on the base as shown in Fig. 3. A corrugated rubber pad 20 is secured to the inner face of the jaw 6 by the lugs 21 which are turned over the upper edge of the rubber pad so that the pad is held in arcuate position and against the face of the jaw 6. At the end opposite the jaw 6, the base is provided with an upwardly extending partition 22 and a pair of inturned flanges 23. A bolt 24 extends through each flange 23 and through the base 1 and an eccentric roller 25 is rotatably mounted on each bolt. The roller 25 is shown more particularly in Fig. 4 and comprises a central portion over which a corrugated rubber tubing 26 is fitted, the roller 25 being provided with an eccentric aperture 27 for the bolt 24. Each roller is provided with an upwardly extending lug 28, shown in Figs. 1 and 2, and a coiled spring 29 is connected to this lug and to a lug 30 on the partition 22. These springs 29 tend to turn the rollers 25 so that the low portions thereof are toward the fruit jar 31, as will be understood from Figs. 1 and 2. Each flange 23 is provided with a depending lug 32 and these lugs form stops for the lugs 28 on the rollers 25 to limit turning movement of these rollers. The base is provided with upwardly extending ribs 33 so that when a fruit jar is positioned thereon the flat portion of the jaw 6 may move underneath the bottom of the jar.

In operation, a jar is positioned on the ribs 33, as shown in dotted lines in Figs. 1 and 2. At this time, the lever 3 is in the position shown in dotted lines toward the bottom of Fig. 1 and the shoe or jaw 6 is also in the position shown in dotted lines in Fig. 1. The knob 13 may be grasped in the hand and moved to the position shown in full lines in Fig. 1 thus turning the lever 3 and moving the jaw 6 forward to engage the fruit jar and bring the fruit jar into engagement with the eccentric rollers 25. By releasing the knob at this time, the spring pressed bar 17 is urged upwardly by the springs 19 thus moving the lever 3 upwardly and the tooth 15 into engagement with the proper tooth 16 on the base 1. If a wrench is applied to the fruit jar cap at this time and pressure is applied in turning the wrench, the jar will start to turn and as it turns will turn the rollers 25 on the eccentric pivots 24 thus turning the high portions of the rollers outwardly to tightly engage the jar between the corrugated rollers 25 and the corrugated pad 20 on the jaw or shoe 6. In this connection it will be noted that the greater the pressure applied in the turning movement, the more the turning movement is resisted by the eccentric rollers pressing the jar against the jaw 6. It will also be noted that these rollers will act in the same way whether the jar is turned in a clockwise or counter-clockwise direction so that the device may be used in screwing the cap onto the jar as well as in unscrewing the cap from the jar. To release the jar, it is only necessary to press down on the handle 13 to disengage the tooth 15 from the teeth 16 and turn the lever toward the dotted position.

Thus, the jar may be easily and quickly clamped in the vise and as quickly and as easily removed. In order to allow the device to be secured to a wall, the flange 23 at the right of Fig. 1 is provided with an upturned bracket 34 while the base is provided with down-turned brackets 35, the brackets 34 and 35 being each provided with an aperture through which a screw may be inserted for securing the device to the wall.

From the foregoing description it becomes evident that the device is very simple and efficient in operation, is very positive in action, will not easily get out of order, is composed of few parts and is of consequent low manufacturing cost and provides a device which accomplishes the objects described.

Having thus fully described my invention, its utility and mode of operation, what I claim and desire to secure by Letters Patent of the United States is—

1. In a fruit jar vise, a base plate, a pair of eccentric rollers rotatably mounted at one end of the base plate, a jaw movable longitudinally of the base plate toward or away from the rollers, a lever pivotally mounted beneath the base plate at one end, a tooth extending upwardly from the opposite end of the lever, the movable jaw being connected to the lever intermediate its ends, a series of teeth on the base plate adapted to be engaged by the tooth of the lever, a spring pressed bar beneath the lever, said bar normally urging the lever upwardly to engage the tooth of the lever in the teeth of the base plate, the teeth of the base plate being arranged to prevent movement of the lever away from the eccentric rollers when the tooth of the lever is engaged therein.

2. In a fruit jar vise, a base plate, a pair of eccentric rollers rotatably mounted on the base plate, a jaw movable toward or away from the rollers, a lever for moving the jaw, yieldable means normally holding the eccentric rollers with the high side away from the jaw, a tooth on the lever, a series of teeth on the base plate adapted to be engaged by said tooth to prevent movement of the jaw away from the eccentric rollers and yieldable means urging the lever tooth into engagement with the teeth of the base plate.

3. In a fruit jar vise, a base plate, a pair of eccentric rollers rotatably mounted on the base plate, a jaw movable longitudinally of the base plate toward or away from the rollers, a lever for moving the jaw, yieldable means normally holding the eccentric rollers with the high side away from the jaw and means for locking the lever in position at different adjustments of the jaw.

4. In a fruit jar vise, a base plate, a pair of eccentric rollers rotatably mounted at one end of the base plate, each roller being covered with corrugated rubber, a jaw provided with a corrugated rubber face, a lever for moving the jaw toward or away from the eccentric rollers, a tooth on the lever and a series of teeth on the base plate adapted to be engaged by said tooth to prevent movement of the jaw away from the eccentric rollers.

5. In a fruit jar vise, a base plate, a pair of eccentric rollers rotatably supported on the base plate, a jaw slidably mounted on the base plate, a lever for moving the slidable jaw toward or away from the eccentric rollers and yieldable means resisting turning movement of the eccentric rollers.

ROGER SANNIPOLI.